US008848976B2

United States Patent
Yilmaz

(10) Patent No.: US 8,848,976 B2
(45) Date of Patent: Sep. 30, 2014

(54) METHOD FOR TRACKING PARAMETRIC MOTION OF AN AREA USING COMPLEX DISCRETE WAVELET TRANSFORM

(75) Inventor: Sener Yilmaz, Ankara (TR)

(73) Assignee: Aselsan Elektronik Sanayi Ve Ticaret Anonim Sirketi, Ankara (TR)

( * ) Notice: Subject to any disclaimer, the term of this patent is extended or adjusted under 35 U.S.C. 154(b) by 912 days.

(21) Appl. No.: 13/002,506

(22) PCT Filed: Jul. 3, 2009

(86) PCT No.: PCT/IB2009/052917
§ 371 (c)(1),
(2), (4) Date: Jan. 3, 2011

(87) PCT Pub. No.: WO2010/001364
PCT Pub. Date: Jan. 7, 2010

(65) Prior Publication Data
US 2011/0103649 A1  May 5, 2011

(30) Foreign Application Priority Data
Jul. 4, 2008  (TR) .................................. 2008 04969

(51) Int. Cl.
G06K 9/00    (2006.01)
H04N 19/615  (2014.01)
G06T 7/20    (2006.01)
H04N 19/547  (2014.01)
H04N 19/61   (2014.01)
H04N 19/63   (2014.01)
H04N 19/13   (2014.01)

(52) U.S. Cl.
CPC ..... *G06T 7/2073* (2013.01); *G06T 2207/20064* (2013.01); *H04N 19/00787* (2013.01); *G06T 2207/30241* (2013.01); *G06T 7/206* (2013.01); *H04N 19/00636* (2013.01); *H04N 19/00781* (2013.01); *G06T 2207/10016* (2013.01); *H04N 19/00121* (2013.01); *G06T 2207/20016* (2013.01); *H04N 19/00818* (2013.01)
USPC ........... 382/103; 382/107; 382/232; 382/236; 382/240; 348/154; 348/699; 375/240.08; 375/240.16

(58) Field of Classification Search
None
See application file for complete search history.

(56) References Cited

PUBLICATIONS

Yilmaz et al. "Complex Discrete Wavelet Transform Based Motion Estimation for Vision-Based Tracking of Targets", Sep. 4-8, 2005, Proc. of 13th European Signal Processing.*
Nitsuwat et al., Video Segmentation Based on the Presence and/or Absence of Moving Objects, Sep. 1999 SPIE vol. 3846, pp. 35-45.*

(Continued)

*Primary Examiner* — Matthew Bella
*Assistant Examiner* — Jason Heidemann
(74) *Attorney, Agent, or Firm* — Intellectual Property Law Group LLP

(57) ABSTRACT

The present invention relates to a video tracker which allows automatic tracking of a selected area over video frames. Motion of the selected area is defined by a parametric motion model. In addition to simple displacement of the area it can also detect motions such as rotation, scaling and shear depending on the motion model. The invention realizes the tracking of the selected area by estimating the parameters of this motion model in the complex discrete wavelet domain. The invention can achieve the result in a non-iterative direct way. Estimation carried out in the complex discrete wavelet domain provides a robust tracking opportunity without being effected by noise and illumination changes in the video as opposed to the intensity-based methods. The invention can easily be adapted to many fields in addition to video tracking.

19 Claims, 3 Drawing Sheets

(56) References Cited

PUBLICATIONS

Figure 1:
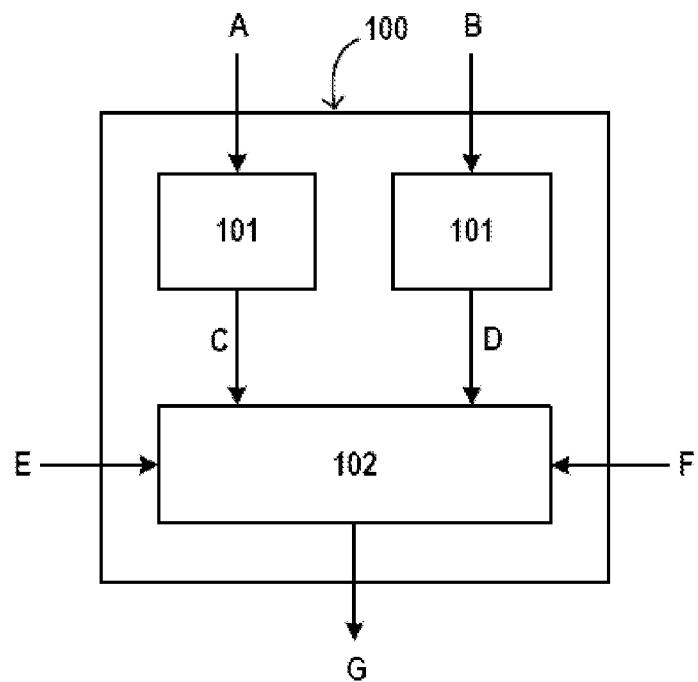
Figure 1:
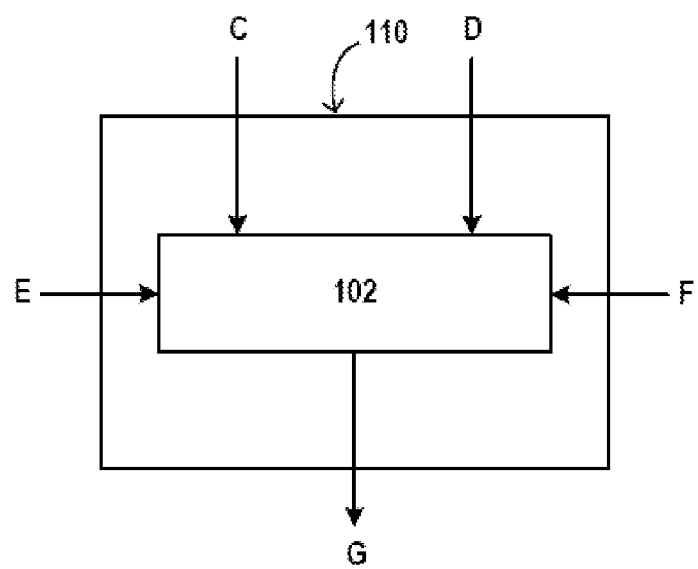

Khare et al; "Daubechies Complex Wavelet Transform Based Moving Object Tracking", Apr. 2007, IEEE, CIISP 2007, pp. 36-40.*

Amiri et al., "A new wavelet domain block matching algorithm for real-time object tracking," Sep. 14-17, 2003, ICIP 2003, IEEE, vol. 3, No., pp. III,961-964.*

Nitsuwat et al; "Motion-based video segmentation using fuzzy clustering and classical mixture model," 2000, IEEE, vol. 1, No., pp. 300-303.*

Magarey et al; "Motion estimation using a complex-valued wavelet transform," Apr. 1998, IEEE, vol. 46, No. 4.*

Castellano et al; "Moving target detection in infrared imagery using a regularized CDWT optical flow," 1999, (CVBVS '99), IEEE, vol. 13, No. 22.*

International Search Report, mailing date Aug. 27, 2010, for corresponding International Application No. PCT/IB2009/052917.

Ashish Khare et al., "Daubechies Complex Wavelet Transform Based Moving Object Tracking", IEEE Symposium on Computational Intelligence in Image and Signal Processing, 2007, CIISP 2007, Apr. 1, 2007, pp. 36-40.

Amiri M. et al., "A New Wavelet Domain Block Matching Algorithm for Real-Time Object Tracking", IEEE Proceedings 2003 International Conference on Image Processing, Barcelona, Spain, ICIP 2003, vol. 3, Sep. 14, 2003, pp. 961-964.

Yilmaz S. And Severcan M., "Complex Discrete Wavelet Transform Based Motion Estimation", $13^{th}$ EUSIPCO 2005, Sep. 8, 2005, Antalya, Turkey, http://www.eurasip.org/Proceedings/Eusipco/Eusipco2005/defevent/papers/cr1180.pdf.

Nitsuwat S. et al., "Motion-based Video Segmentation Using Fuzzy Clustering and Classical Mixture Model", IEEE Proceedings 2000 International Conference on Image Processing, ICIP 2000, vol. 1, 2000, pp. 300-303.

Sari, Huseyin, "Motion Estimation Using Complex Discrete Wavelet Transform", The Graduate School of Natural and Applied Sciences of the Middle East Technical University, The Department of Electrical and Electronics Engineering, 2003, pp. 1-69, http://etd.lib.metu.edu.tr/upload/1223205/index.pdf.

Magarey J. et al., "Motion Estimation Using a Complex-Valued Wavelet Transform", IEEE Transactions on Signal Processing, vol. 46, No. 4, Apr. 1, 1998, pp. 1069-1084.

Castellano G. et al., "Moving Target Detection in Infrared Imagery Using a Regularized CDWT Optical Flow", Computer Vision Beyond the Visible Spectrum: Methods and Applications, 1999 Proceedings, Jun. 21, 1999, pp. 13-22.

Khansari M. et al., "Adaptive Search Window for Object Tracking in the Crowds Using Undecimated Wavelet Packet Features", World Automation Congress, Jul. 1, 2006, pp. 1-6.

\* cited by examiner

METHOD FOR TRACKING PARAMETRIC MOTION OF AN AREA USING COMPLEX DISCRETE WAVELET TRANSFORM

CROSS-REFERENCE TO RELATED APPLICATIONS

This application is a U.S. National Phase application, under 35 U.S.C. §371, of International Application no. PCT/IB2009/052917, with an international filing date of Jul. 3, 2009 and claims benefit of Turkish Application no. 2008/04969 filed on Jul. 4, 2008, and which are hereby incorporated by reference for all purposes.

The present invention relates to an area tracker that enables automatic tracking of a selected area over video frames using complex discrete wavelet transform.

FIELD OF THE INVENTION AND THE STATE OF THE ART

A video image is comprised of a series of consecutive video frames. Each video frame is in fact a stationary image. These images are formed in line with the information coming from any imaging sensor such as video camera or infrared (thermal) camera. Output of these cameras can be analog or digital. If they are analog, the video image can be digitized with the help of frame grabbers.

Video trackers operate on the video frames coming from the video source. The area or object which is to be tracked in the video is supplied to the tracking algorithm upon being selected either automatically or by the user. In many systems, the desired target to be tracked is marked by a square or rectangular area. There are different approaches for tracking this marked area. One of the commonly used approaches among these is the area trackers by which this area is tracked visually. Existing area trackers generally function for finding the new location of the target by trying to match the selected area on the next video frame. There are various methods for finding the new location of the target. The known and commonly used methods are matching-based, flow-based and phase-based methods.

In matching-based methods, the selected area is recorded as the target template and is tried to be matched in the following frame. For matching, criteria like correlation, lowest mean square error are used. The area to be matched in the new frame is scanned using search methods and matching is performed accordingly. With these methods general translational motion can be determined. Translational motion is the displacement of the selected area as a whole. Very difficult operations are required for detecting the affine changes including scale, rotation and shear type motions in addition to the translational motion with these methods. Consequently these methods are usually employed in determining translational motion. Hence, the shape changes occurring in the target image may cause the target to be lost after a certain period of time in matching-based methods. In order to prevent this, proper updating of the target template provides a limited solution. However, it is still possible that the template drifts away from the original target and the track is finally lost [3]. The main reason of this drift is that matching is performed at pixel-level accuracy, in other words by performing shifting at integer steps. A limited solution to this is to perform matching via shifting by ½ and ¼ of a pixel. However, due to the nature of these methods, this accuracy is always limited, and increasing this accuracy increases the computational load exponentially.

Flow-based methods, as opposed to matching-based methods, can achieve sub pixel accuracy directly. These methods aim to obtain the direction of the flow of an object or area as a whole, assuming that the intensity will remain constant throughout video frames. Lucas and Kanade [4] have shown that translation of a selected area can be calculated iteratively according to the optical flow. Shi and Tomasi [5] generalized this method by incorporating the affine motion model and used it to track point features. Hager and Belhumeur [6] worked on an efficient method to obtain the affine solution and used it for automatic area tracking. In addition, they have formed a more generic method by replacing the affine model with a parametric motion model. Baker and Matthews [7] combined all these methods forming a general model and finally showed that all of them converge to the same result. All of these methods use video information and obtain the result iteratively. The present invention approaches the area tracking problem as Hager and Belhumeur [6], however, different from the methods mentioned herein, it extracts the solution in the Complex Discrete Wavelet domain in a non-iterative way.

Estimation of motion of an area is also possible by phase-based methods. In these methods, estimation takes place in the frequency domain. It is based on the Fourier transform. However, since translational motions (shift) occurring in the image can not be localized in frequency, the Short-Time Fourier Transform is preferred. Thus, the phase correlation method is derived [2]. However, this method can only determine translational motion. For affine motions, the affine Fourier theorem is developed [8]. Although these methods are robust to changes in contrast and brightness unlike the video-based methods, they are not as successful as these methods in terms of tracking accuracy and persistence. The Discrete Wavelet Transform (DWT), which eliminates the localization problem of Fourier transform and allows for both frequency and time localization, cannot be used in motion estimation due to its nature. For the estimation of motion, the transform should be shift-invariant. Due to this, several adaptations have been proposed on the DWT [9][10][11] Magarey and Kingsbury [1] developed the "Complex Discrete Wavelet Transform" (CDWT) for dense motion estimation. This method performs estimation in the CDWT domain over the complex phase and is compatible to intensity-based methods in terms of accuracy and robustness. However, dense motion estimation is the estimation of the individual motions of each pixel within an image. Whereas in area tracking, motion of the selected area as a whole is important. Hence, the use of CDWT in area tracking will be possible by generalizing this method [1] in order to operate on areas. However, unlike in the intensity domain, it is not straightforward to generalize the existing structure in order to allow the estimation of an area rather than a pixel. The structure extracting the solution should be readapted accordingly. The CDWT is only approximately shift-invariant [1]. Additionally, in order to incorporate affine motion, the transform should also be scale-, rotation- and shear-invariant besides linear shifts. However, due to its nature the CDWT is not suitable for this. Within the scope of the invention, this method is generalized to incorporate an area rather than a pixel and to estimate the motion of this area according to a parametric model, and is used in area tracking.

The United States patent document No. 6,590,999, within the state of the art, discloses a robust statistical tracking method. Although this method is quite robust due to its statistical nature, it lacks accuracy. Furthermore, it experiences difficulties in properly adapting to target size changes.

Similar video trackers are disclosed in other United States patent documents No. U.S. Pat. No. 4,133,004, U.S. Pat. No.

6,172,747, U.S. Pat. No. 3,953,670, U.S. Pat. No. 4,270,143, U.S. Pat. No. 4,719,584 and U.S. Pat. No. 4,849,906, all of which are within the state of the art.

TECHNICAL PROBLEMS AIMED TO BE SOLVED BY THE INVENTION

Many methods in the state of the art, either operate on a certain type of video source or require adaptations and parameter adjustments depending on the video source. This proposed method does not require any changes to be made in the algorithm depending on the type of the video source.

The method tracks the image located within the area that is desired to be tracked in the video frame, and it does not make a distinction of any target, object or shape. For this reason there is no limitation regarding the area selected for tracking. Changes in shape and intensity that will occur within the selected area throughout the video can be defined by the parametric motion model and in this way changes in scale, rotation and shear can also be determined in addition to pure translation. Here, when the number of parameters discussed exceeds two, most of the existing methods may attain a solution using an iterative structure [4][5][6][7] and the number of iterations to be performed may vary according to the motion and performance criteria at that instant. This makes it difficult to estimate the computation time required by the method. The present invention can obtain the result directly without any need for iterations and in this regard it is more advantageous than the existing methods.

In addition to these, existing methods use intensity information for the estimation of the parameters. Intensity information is sensitive to changes in illumination (contrast and brightness), and noise, and this sensitivity causes the target to be lost when used for tracking purposes. The present invention performs the estimation on the phase information obtained via complex discrete wavelet transform of the video frames rather than the intensity information itself. Hence, problems experienced with intensity based methods are not encountered.

SUMMARY OF THE INVENTION

The objective of the present invention is to realize a complex wavelet tracker where "Complex Discrete Wavelet Transform" based motion estimation method [1] is generalized and used in area tracking, and where the motion is defined by a parametric model.

Another objective of this invention is to realize a complex wavelet tracker where an area marked by the operator on the input video is automatically tracked in real time in a robust way.

A further objective of the invention is to realize a general complex wavelet tracker which is independent from the type of the video received from a video source such as infrared, color, grayscale day camera, LADAR (Laser Radar), SAR (Synthetic Aperture Radar), etc; and which does not require any modification in the method or settings.

An additional objective of the invention is to realize a more robust complex wavelet tracker which is more accurate than the existing methods for generating sightline control signals that are especially required in target tracking systems and that enable tracking of the target via a camera, and which does not easily lose the target that is being tracked especially against noise and illumination changes.

DETAILED DESCRIPTION OF THE INVENTION

The method realized to fulfill the objectives of the invention are illustrated in the accompanying figures in which, FIG. 1 (a)—Functional block diagram of Complex Wavelet Tracker.

FIG. 1 (b)—Functional block diagram of an alternative Complex Wavelet Tracker.

Figure 2:
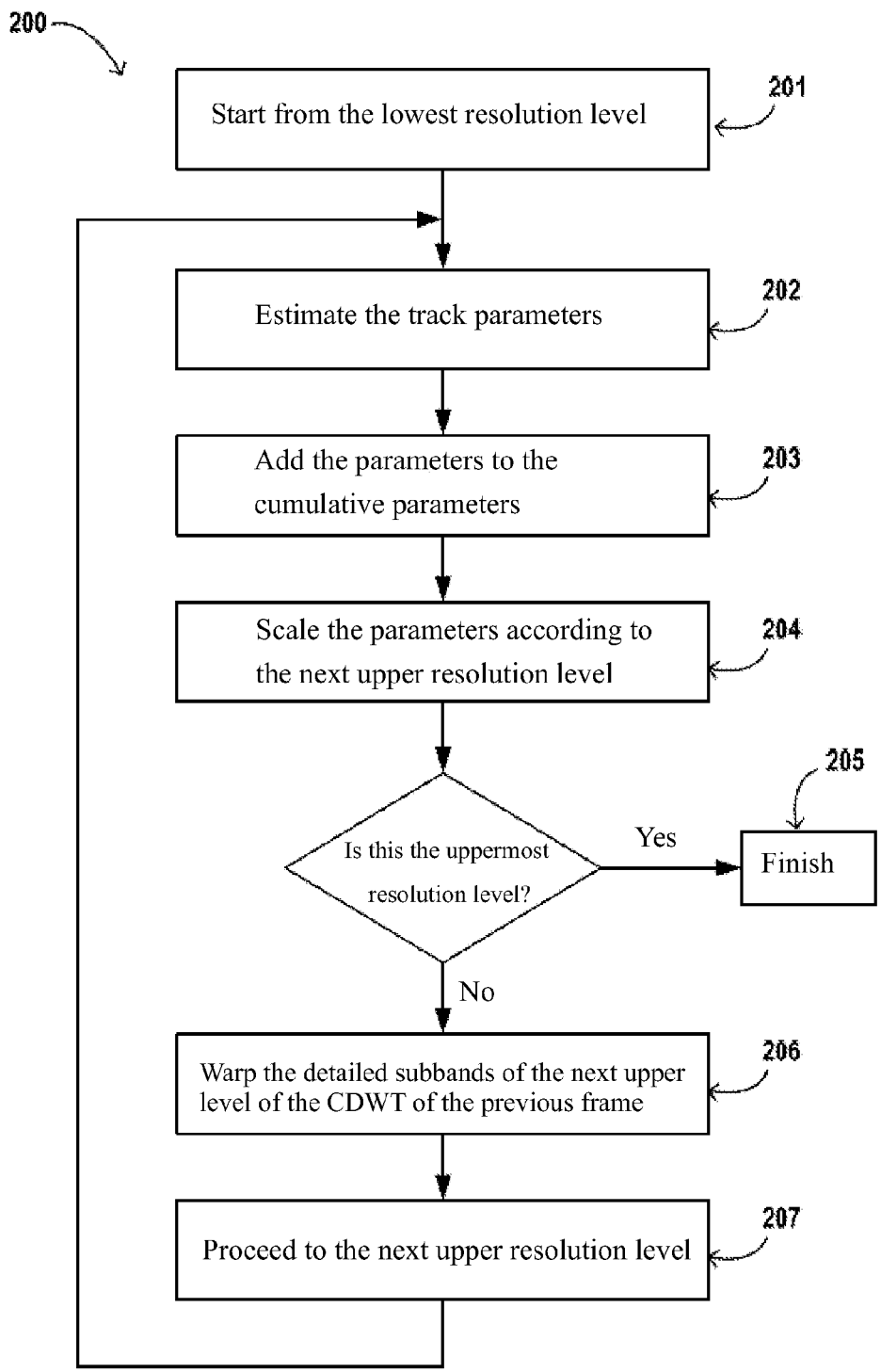

FIG. 2—Functional block diagram of the complex discrete wavelet transform based area tracking method.

Figure 3:
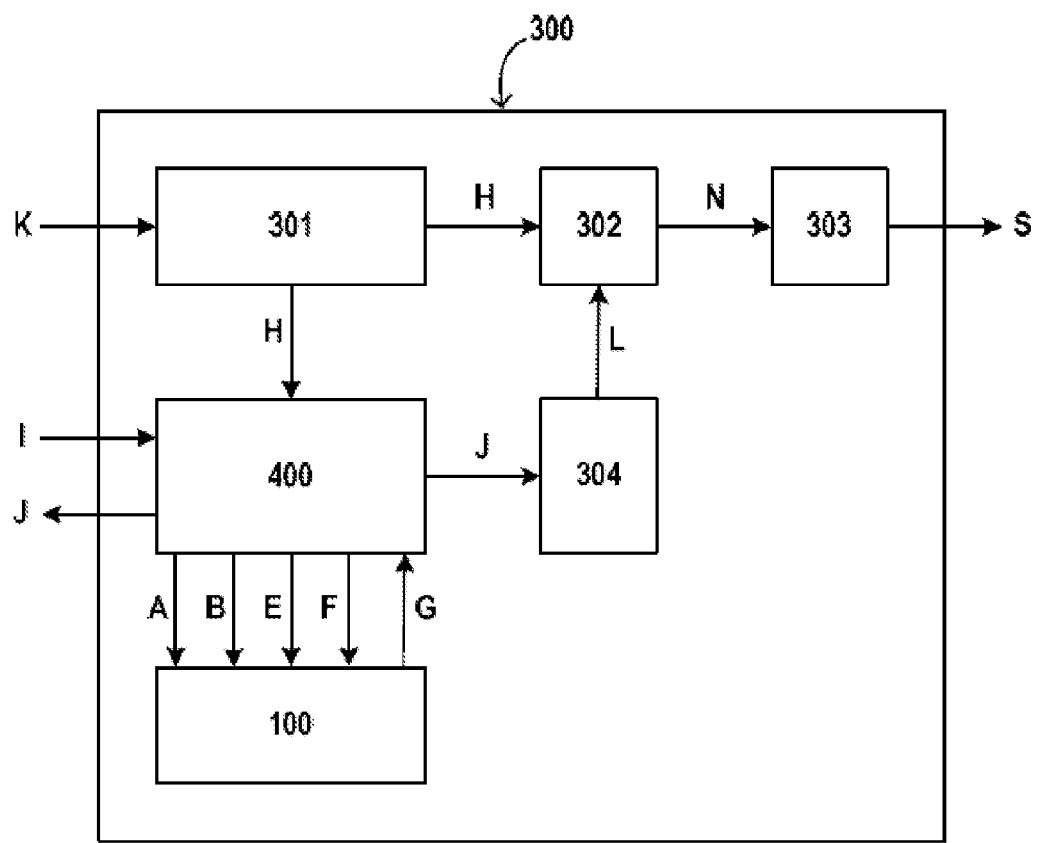

FIG. 3—Functional block diagram of an automatic target tracking unit where the invention can be applied.

Figure 4:
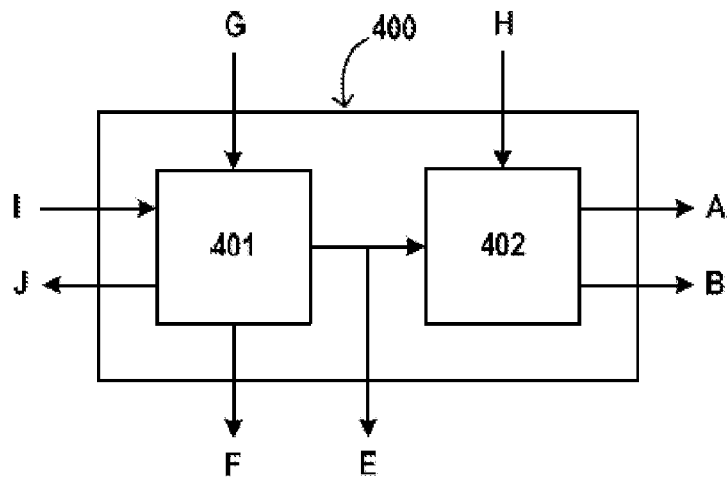

FIG. 4—Functional block diagram of the controller.

The components shown in the figures are numbered as follows:

| | |
|---|---|
| (100, 110) | Complex Wavelet Tracker |
| (101) | Complex discrete wavelet transform unit |
| (102) | Track parameters estimation unit |
| (200) | Complex discrete wavelet transform based area tracking method |
| (300) | Automatic video tracking unit |
| (301) | Video frame grabber |
| (302) | Video multiplexer |
| (303) | Video digital/analog converter |
| (304) | Symbol generator |
| (400) | Controller |
| (401) | Tracker controller |
| (402) | Image controller |
| (A) | Image-1 |
| (B) | Image-2 |
| (C) | CDWT-1 |
| (D) | CDWT-2 |
| (E) | Track gate |
| (F) | Mask |
| (G) | Track parameters |
| (H) | Video frames |
| (I) | User input |
| (J) | Target status |
| (K) | Video |
| (L) | Symbols |
| (N) | Video frames with symbols |
| (S) | Video with symbols |

The inventive complex wavelet tracker (100) essentially comprises at least two complex discrete wavelet transform (CDWT) units (101) and at least one track parameters estimation unit (102) where CDWT (C and D) of at least two images are input.

The CDWT unit (101) calculates [1] the CDWT (C or D) of the image (A or B) that comes thereto. In case the incoming images are colored, the colored images are first converted to grayscale images by means of known image processing techniques.

The track parameters estimation unit (102), performs the estimation of the motion between the images via the CDWT's (C and D) of these images according to a parametric motion model. The area whose motion will be estimated can be defined preferably by a track gate (E) and/or a mask (F). The track gate enables to define the area to be tracked by a geometrical shape like a square, rectangle, or ellipse. The mask (F) allows defining the desired area to be tracked by selecting the desired pixels within the image or track gate (E). Additionally, it allows for assigning weights to each pixel that are selected by the mask.

Parametric motion models aim to describe the projection of a three dimensional motion of a surface into the two dimensional image plane (A. M. Tekalp, *Digital Video Processing*, Prentice-Hall Inc., 1995). The motion model can be defined by the warp function $M(x;p)$. This function takes the parameters x and p. Here, $x=[x_1, x_2]^T$ is the position of the pixel, while $p=[p_1, \ldots, p_k]^T$ is the k number of tracking parameters of the motion model (G). The warp function $M(x;p)$ maps the pixel at position x in the previous video frame, to a sub-pixel location in the next video frame using the p parameters.

Sub-pixel is any point between neighboring pixels that does not correspond to an integer location.

The set of allowed warps may vary depending on the type of the target or area that is desired to be tracked. Therefore, it is possible to employ the most suitable motion model according to the requirements of the application. In order to facilitate the description of the invention, three basic motion models and their usage within the scope of the invention are described below. These models are translational, similarity and affine motion models. The translational motion model only comprises displacement:

$$M(x; p) = \begin{bmatrix} x_1 + p_1 \\ x_2 + p_2 \end{bmatrix}. \tag{1}$$

The similarity model also comprises scaling and rotation in addition to displacement:

$$M(x; p) = \begin{bmatrix} (1 + p_1)x_1 - p_2 x_2 + p_3 \\ p_2 x_1 + (1 + p_1)x_2 + p_4 \end{bmatrix}. \tag{2}$$

Here, scaling is same for the horizontal and vertical axes. In the affine motion model, these axes can vary independently from each other and in addition to the motion types in the similarity model, shear motion is also comprised by this model:

$$M(x; p) = \begin{bmatrix} (1 + p_1)x_1 + p_3 x_2 + p_5 \\ p_2 x_1 + (1 + p_4)x_2 + p_6 \end{bmatrix}. \tag{3}$$

The affine motion model essentially describes the orthographic projection of a three dimensional rigid surface into two dimensions (A. M. Tekalp, *Digital Video Processing*, Prentice-Hall Inc., 1995). For that reason it is a widely used motion model.

Estimation of the track parameters of the pixels located within the selected area throughout the video frames according to these motion models will be defined as "area tracking" within the scope of the present invention [6].

The said invention is based on the complex discrete wavelet transform (CDWT) based two dimensional dense motion estimation method [1]. Estimation of the track parameters is performed in a hierarchical way using the CDWT's of the images. This structure originates from the nature of the complex discrete wavelet transform (CDWT). All wavelet transforms decompose the image into different resolution levels. Two dimensional standard discrete wavelet transform (DWT) forms one low resolution sub-image and three detail sub-bands at each resolution level. The sub-image formed at this level is used for the computation of the subsequent level. In the CDWT, however, contrary to the DWT, in each level two low resolution sub-images and six detail sub-bands are constructed [1]. In CDWT, different from the DWT, process continues on two branches parallel to each other by using these two low resolution sub-images. In addition to this, all sub-bands and sub-images are complex valued.

The inventive complex wavelet tracker realizes estimation of the track parameters p of the motion model in a hierarchical structure similar to the base method [1], with the following steps (200) (FIG. 2). In the said steps, the estimation of the track parameters performed at each level is denoted by p, while the cumulative track parameters that relate the said parameters among levels is denoted by p'. Each resolution level within the hierarchical structure is identified as m. The highest resolution level m=0 corresponds to the original resolution level and as the level m increases the resolution actually decreases.

Estimation starts with the lowest resolution level (m=$m_{max}$) (201).

Track parameters (p) are estimated for this level using the complex discrete wavelet transforms at the current processed level (m) (202).

Track parameters (p) are added to the cumulative track parameters (p') (203).

Cumulative track parameters (p') are scaled according to the next upper resolution level (m−1) (204).

If the current processed level is the uppermost resolution level (m=$m_{min}$), the estimation of the track parameters is completed (205) and the solution equals to the cumulative track parameters (p') scaled to the original resolution level (m=0).

If the current processed level is not the uppermost resolution level (m≠$m_{min}$), coefficients of the complex discrete wavelet transform of the previous video frame at the next upper level (m−1) are warped according to the motion model (M) using the cumulative track parameters (p') (206).

Estimation continues at the next upper resolution level (m=m−1) (207) with the track parameters estimation step (202).

The estimation method in the step of track parameters estimation (202) is based on the CDWT based dense motion estimation method [1]. This method [1] is based on the local translational model.

$$A(x, t_{n-1}) = A(x + d, t_n). \tag{4}$$

Here, A(x, t) represents the true brightness value of the pixel at location x=$[x_1, x_2]^T$ on the video frame at time t; and d is the displacement of that pixel. This model expresses that a pixel at location x in the previous frame shifts to the location x+d in the following frame. What is mapped here is actually the brightness value of the pixel at these two locations and hence might not be the true motion.

In order to fulfill the objectives of the present invention, a more generic motion model is used instead of the model given in Formula (4):

$$A(x, t_{n-1}) = A(M(x; p), t_n), x \in W(x) \tag{5}$$

where the equality is extended to hold over a set of pixels defined in W instead of a single pixel. The difference of this model from the previous one is that all pixels within the area defined as W are warped with the motion model M according to their positions as a whole and are transformed into the area on the following frame. Here, the parameters p of the motion model M are the same for all pixels within the area. In this sense, the objective is to estimate the parameters p using the given two frame observations. However, since a video frame cannot be observed without being corrupted by noise [2], it will be assumed that the video frames are acquired by a zero-mean additive white Gaussian noise. Hence, the true video frame A is observed as follows:

$$I(x, t) = A(x, t) + e(x, t) \tag{6}$$

where e(x,t) denotes noise. As CDWT is a linear transform, combining Formulas (5) and (6) will yield the following expression for a detailed CDWT subband (s) at level m.

$$D^{(s,m)}(x, t_{n-1}) - D^{(s,m)}(M(x; p^{(m)}), t_n) = e^{(s,m)}(x). \tag{7}$$

Here, $D^{(s,m)}(x,t)$ denotes the detailed CDWT subband s of level m of the video frame at time t, and $p^{(m)}$ denotes the track parameters vector valid for the m level. The goal is to determine the most likely $p^{(m)}$ value between the detailed subbands of the CDWT's of the video frames that matches the CDWT coefficient of the pixel at location x to the CDWT coefficient at location $M(x;p^{(m)})$ on the corresponding detailed subband of the following frame. Assuming that the track parameters and the previous video frame observation are independent from each other and applying the Bayes' rule, the maximum likelihood estimation can be obtained. When a single detailed subband is used, the result is on a line. All detailed subband of one level of the CDWT emphasize changes in different directions. Accordingly, in order to obtain a single solution, the lines of at least two subbands should be superposed. For this reason, in the base method [1], all six detailed subbands are used at level m. The use of more than two sub-bands in the solution increases robustness of the method [1]. Thus, the estimation [1] will be:

$$\hat{p}^{(m)}(x) = \operatorname*{argmin}_{p} \left\{ \sum_{s=1}^{6} \frac{|D^{(s,m)}(x, t_{n-1}) - D^{(s,m)}(x+d, t_n)|^2}{P^{(s,m)}} \right\} \quad (8)$$

where $P^{(s,m)}$ denotes the energy of the corresponding wavelet filter of subband s and level m [1]. The base method obtains the estimation according to Formula (8). This estimation enables estimation of the displacement (d) of a single pixel. In order to fulfill the objective of the invention, derivation was continued based on Formula (8). Assuming that noise is independent among neighboring pixels, this expression [1] combined with Formula (7) can be adapted to an area:

$$\hat{p}^{(m)}(W^{(m)}(t_{n-1})) = \operatorname*{argmin}_{p} \quad (9)$$

$$\left\{ \sum_{x \in W^{(m)}(t_{n-1})} w^{(m)}(x) \sum_{s=1}^{6} \frac{|D^{(s,m)}(x, t_{n-1}) - D^{(s,m)}(M(x, p), t_n)|^2}{P^{(s,m)}} \right\}$$

Noise being independent between neighboring pixels enables the simple addition of the values of each pixel in Formula (9). Here, a weight w(x) is also included for each pixel in order to enable a mask to be defined within W. In this way, the problem of area tracking converges to the minimization of the objective function O with respect to parameters p:

$$O^{(m)}(p^{(m)}) = \quad (10)$$

$$\sum_{x \in W^{(m)}(t_{n-1})} w^{(m)}(x) \sum_{s=1}^{6} \frac{|D^{(s,m)}(x, t_{n-1}) - D^{(s,m)}(M(x, p), t_n)|^2}{P^{(s,m)}}.$$

Therefore, by proceeding similar to the base method [1], Formula (10) can be converted into the following expression:

$$O^{(m)}(p^{(m)}) \approx \quad (11)$$

$$\sum_{s=1}^{6} \sum_{x \in W^{(m)}(t_{n-1})} \frac{w^{(m)}(x)}{P^{(s,m)}} [|D^{(s,m)}(x, t_{n-1})| - |D^{(s,m)}(x, t_n)|]^2 +$$

$$\sum_{s=1}^{6} \sum_{x \in W^{(m)}(t_{n-1})} \frac{w^{(m)}(x)}{P^{(s,m)}}$$

$$|D^{(s,m)}(x, t_{n-1}) D^{(s,m)}(x, t_n)| [2^m (\Omega^{(m,s)})^T (M(x; p^{(m)}) - x) - \theta^{(s,m)}(x)]^2$$

where $\Omega^{(s,m)}$ is the center frequency of the corresponding wavelet filter of subband s of level m [1], and $\theta^{(s,m)}(x)$ is the phase difference between the complex CDWT coefficients of the corresponding detailed subbands at location x [1]. The objective function given in Formula (11) can also be characterized with a quadric surface as in the base method [1]. Hence, the solution can be obtained by taking the derivative of the objective function with respect to the parameter vector and setting it equal to zero:

$$\nabla O^{(m)}(p^{(m)}) = 0 \quad (12)$$

or $$\begin{bmatrix} \frac{\partial}{\partial p_1} O^{(m)}(p^{(m)}) \\ \vdots \\ \frac{\partial}{\partial p_k} O^{(m)}(p^{(m)}) \end{bmatrix} = 0. \quad (13)$$

If $M(x; p) = x + \begin{bmatrix} \tilde{M}_1(x; p) \\ \tilde{M}_2(x; p) \end{bmatrix} \quad (14)$ is used as the warp function and $$2^m (\Omega^{(s,m)})^T = [\Omega_1^{(s)} \Omega_2^{(s)}] \quad (15)$$

as the center frequency, and applying chain rule to Formula (11), the following equality is obtained:

$$\sum_{s=1}^{6} \sum_{x \in W^{(m)}(t_{n-1})} \frac{w^{(m)}(x)}{P^{(s,m)}} \quad (16)$$

$$E^{(s,m)}(x, t_{n-1}, t_n) [\Omega_1 \tilde{M}_1(x; p^{(m)}) + \Omega_2 \tilde{M}_2(x; p^{(m)}) - \theta^{(s,m)}(x)]$$

$$(\Omega_1 \nabla \tilde{M}_1(x; p^{(m)}) + \Omega_2 \nabla \tilde{M}_2(x; p^{(m)})) = 0$$

Here, the expression $$E^{(s,m)}(x; t_{n-1}, t_n) = |D^{(s,m)}(x, t_{n-1}) D^{(s,m)}(x, t_n)| \quad (17)$$

defines the "activity" in the corresponding pixel [1]. The equality in Formula (16) depends on the motion model M. Thus, in order to proceed with the solution, the motion model M should be substituted in this equality. Formula (16) is actually a set of linear equations in the form:

$$Tp = a \quad (18)$$

whose solution can be obtained by:

$$p = T^{-1} a \quad (19)$$

Here, matrices T and a are formed from the CDWT coefficients of the detailed subbands depending on the motion model. Since parameter vector p is a collection of the parameters used in the model, its length depends on the number of the parameters k. For the translational motion model two parameters are used and the matrices T and a can be obtained as follows:

$$T = \sum_{s=1}^{6} \sum_{x \in W^{(m)}(t_{n-1})} \frac{w^{(m)}(x)}{P^{(s,m)}} E^{(s,m)}(x, t_{n-1}, t_n) \begin{bmatrix} \Omega_1^2 & \Omega_1 \Omega_2 \\ \Omega_1 \Omega_2 & \Omega_2^2 \end{bmatrix} \quad (20)$$

$$a = \sum_{s=1}^{6} \sum_{x \in W^{(m)}(t_{n-1})} \frac{w^{(m)}(x)}{P^{(s,m)}} E^{(s,m)}(x, t_{n-1}, t_n) \theta^{(s,m)}(x) \begin{bmatrix} \Omega_1 \\ \Omega_2 \end{bmatrix}. \quad (21)$$

In the similarity model four parameters are used:

$$T = \sum_{s=1}^{6} \sum_{x \in W^{(m)}(t_{n-1})} \frac{w^{(m)}(x)}{P^{(s,m)}} E^{(s,m)}(x, t_{n-1}, t_n) \begin{bmatrix} U & V \\ V^T & Z \end{bmatrix} \quad (22)$$

$$a = \sum_{s=1}^{6} \sum_{x \in W^{(m)}(t_{n-1})} \frac{w^{(m)}(x)}{P^{(s,m)}} E^{(s,m)}(x, t_{n-1}, t_n) \theta^{(s,m)}(x) \begin{bmatrix} \Omega_1 x_1 + \Omega_2 x_2 \\ \Omega_2 x_1 - \Omega_1 x_2 \\ \Omega_1 \\ \Omega_2 \end{bmatrix} \quad (23)$$

where the matrices U, V and Z matrices included in Formula (22) are obtained as follows:

$$U = \begin{bmatrix} (\Omega_1 x_1 + \Omega_2 x_2)^2 & (\Omega_1 x_1 + \Omega_2 x_2)(\Omega_2 x_1 - \Omega_1 x_2) \\ (\Omega_1 x_1 + \Omega_2 x_2)(\Omega_2 x_1 - \Omega_1 x_2) & (\Omega_2 x_1 - \Omega_1 x_2)^2 \end{bmatrix} \quad (24)$$

$$V = \begin{bmatrix} \Omega_1(\Omega_1 x_1 + \Omega_2 x_2) & \Omega_2(\Omega_1 x_1 + \Omega_2 x_2) \\ \Omega_1(\Omega_2 x_1 - \Omega_1 x_2) & \Omega_2(\Omega_2 x_1 - \Omega_1 x_2) \end{bmatrix} \quad (25)$$

$$Z = \begin{bmatrix} (\Omega_1)^2 & (\Omega_1 \Omega_2) \\ (\Omega_1 \Omega_2) & (\Omega_2)^2 \end{bmatrix} \quad (26)$$

Six parameters are used in the affine model:

$$T = \sum_{s=1}^{6} \sum_{x \in W^{(m)}(t_{n-1})} \frac{w^{(m)}(x)}{P^{(s,m)}} E^{(s,m)}(x, t_{n-1}, t_n) \begin{bmatrix} U & V \\ V^T & Z \end{bmatrix} \quad (27)$$

$$a = \sum_{s=1}^{6} \sum_{x \in W^{(m)}(t_{n-1})} \frac{w^{(m)}(x)}{P^{(s,m)}} E^{(s,m)}(x, t_{n-1}, t_n) \theta^{(s,m)}(x) \begin{bmatrix} \Omega_1 x_1 \\ \Omega_2 x_1 \\ \Omega_1 x_2 \\ \Omega_2 x_2 \\ \Omega_1 \\ \Omega_2 \end{bmatrix} \quad (28)$$

U, V and Z matrices included in Formula (27) are obtained as follows:

$$U = \begin{bmatrix} (\Omega_1 x_1)^2 & (\Omega_1 \Omega_2 x_1^2) & (\Omega_1^2 x_1 x_2) & (\Omega_1 \Omega_2 x_1 x_2) \\ (\Omega_1 \Omega_2 x_1^2) & (\Omega_2 x_1)^2 & (\Omega_1 \Omega_2 x_1 x_2) & (\Omega_2^2 x_1 x_2) \\ (\Omega_1^2 x_1 x_2) & (\Omega_1 \Omega_2 x_1 x_2) & (\Omega_1 x_2)^2 & (\Omega_1 \Omega_2 x_2^2) \\ (\Omega_1 \Omega_2 x_1 x_2) & (\Omega_2^2 x_1 x_2) & (\Omega_1 \Omega_2 x_2^2) & (\Omega_2 x_2)^2 \end{bmatrix} \quad (29)$$

-continued $$V = \begin{bmatrix} (\Omega_1^2 x_1) & (\Omega_1 \Omega_2 x_1) \\ (\Omega_1 \Omega_2 x_1) & (\Omega_2^2 x_1) \\ (\Omega_1^2 x_2) & (\Omega_1 \Omega_2 x_2) \\ (\Omega_1 \Omega_2 x_2) & (\Omega_2^2 x_2) \end{bmatrix} \quad (30)$$

$$Z = \begin{bmatrix} (\Omega_1)^2 & (\Omega_1 \Omega_2) \\ (\Omega_1 \Omega_2) & (\Omega_2)^2 \end{bmatrix} \quad (31)$$

In the step of addition of track parameters to the cumulative parameters (203), the track parameters (p) estimated for the current processed level are added to the cumulative track parameters (p') that will form the final parameters. The initial value of the cumulative parameters is zero.

In the step of scaling of cumulative track parameters according to the next upper resolution level (204), the parameters in the parameter vector p' are scaled according to their roles in the motion model M. Thus, the scaling process here differs according to the motion model. Parameter values are doubled for the translational motion model; in the similarity model $p_1$ and $p_2$ remain the same, while $p_3$ and $p_4$ are doubled; and in the affine model $p_5$ and $p_6$ are doubled while the others remain the same.

In the step of warping the detailed subbands of the CDWT (206), the warping process is realized by using the cumulative parameters at the motion model the process is carried out, for all the six detailed subbands of the CDWT of the previous frame at the next upper resolution level. All pixels are warped by using the same parameters. CDWT coefficients of the pixels which do not correspond to integer coordinates during the warping process are obtained from the CDWT coefficients at the integer coordinates using the windowed sin c interpolator described in [1].

In the track parameters estimation of the inventive complex wavelet tracker, alternatively, the step of addition of parameters to the cumulative parameters (203) and the step of scaling of cumulative parameters according to the next upper resolution level (204) among the above mentioned steps are realized by starting from the T and a matrices from which p is calculated instead of the track parameters p itself.

In the step of addition of parameters to the cumulative parameters (203), alternatively, firstly Tp' is added to matrix a for the processed level. This is required for reversing the process realized in the step of warping the detailed subbands of the CDWT in the previous level (206). Then, T and a matrices are added to the cumulative T' and a' matrices where the final parameters will be calculated. Cumulative track parameters (p') are calculated from the newly calculated T' and a' matrices as $p'=(T')^{-1}(a')$. The initial value of the cumulative matrices is zero.

In the step of scaling of cumulative track parameters according to the next upper resolution level (204), alternatively, in addition to the scaling realized for the cumulative track parameters (p'), T' and a' matrices are also scaled. Since these matrices depend on the motion model used, their scaling differs from one model to another. For the translational motion model, matrix a decreases to half and matrix T decreases to $\frac{1}{4}^{th}$. In the similarity model, matrix U forming T remains the same, matrix V decreases to half, matrix Z decreases to $\frac{1}{4}^{th}$; and the last two parameters of matrix a, $a_3$ and $a_4$, decrease to half. In the affine model, similarly, matrix U forming T remains the same, matrix V decreases to half, matrix Z decreases to $\frac{1}{4}^{th}$; and again the last two parameters of matrix a, $a_5$ and $a_6$, decrease to half.

In track parameters estimation of the inventive complex wavelet tracker (100, 110), in the case that the input image is colored, as an alternative to converting the colored image to grayscale image, the track parameters estimation can also be realized directly to operate on colored images. For this, the step of estimating track parameters (202) among the above mentioned steps will be adapted to comprise three color components. Assuming that noise of pixels is independent for the three color components, the following objective function is obtained by starting out from Formula (10).

$$O^{(m)}(p^{(m)}) = \sum_{k=1}^{3} \sum_{x \in W^{(m)}(t_{n-1})} w^{(m)}(x) \frac{|D_k^{(s,m)}(x, t_{n-1}) - D_k^{(s,m)}(M(x, p), t_n)|^2}{\sigma_k^2 P^{(s,m)}} \quad (32)$$

where $\sigma_k^2$ gives the standard deviation of the noise of the color components and $D_k$ denotes the detailed subband of the color component k. The minimizing p parameters of this objective function give the track parameters required at this step.

The inventive complex wavelet tracker (100, 110) can calculate the confidence of the estimated track parameters as a quality measure. This measure is given in the base method [1] for the estimation of a single pixel. Within the scope of the invention, this measure has been generalized to provide similar information regarding the success of the motion estimation of the area. This measure can be formed in a similar way followed in track parameters estimation:

$$C^{(m)}(W^{(m)}(t_{n-1}); t_{n-1}, t_n) = 1 - \frac{r^{(m)}(W^{(m)}(t_{n-1}); t_{n-1}, t_n)}{2} \quad (33)$$

where C denotes the confidence of the estimation performed for the frames at times $t_{n-1}$ and $t_n$ for the area defined with W. The term r, in Formula (33), denotes the residual and can be computed similar to the base method [1] while adapting the derivations to the area W.

In one embodiment of the inventive complex wavelet tracker (100), the images of the video frames desired to be tracked are input to the CDWT unit (101) as image-1 (A) and image-2 (B). Here, the complex discrete wavelet transforms [1] of the images are calculated and these transforms are sent to the track parameters estimation unit (102) as CDWT-1 (C) and CDWT-2 (D) data. The track parameters estimation unit (102) calculates the new track parameters (G) using the CDWT's (C and D) of the images by means of the inventive area tracking method steps (200) in line with the incoming track gate (E) and/or mask (F) information, if present.

In another embodiment of the inventive complex wavelet tracker (110), CDWT units are not present. The required CDWT transforms of the images of the video frames desired to be tracked are directly input to the track parameters estimation unit (102) as CDWT-1 (C) and CDWT-2 (D) data. The track parameters estimation unit (102) calculates the new track parameters (G) using the CDWT's (C and D) of the images by means of the inventive area tracking method steps (200) in line with the incoming track gate (E) and/or mask (F) information, if present.

In one embodiment of the said invention, the Complex Wavelet Tracker (100) is used in an automatic video tracking unit (300). This automatic video tracking unit (300) comprises a Complex Wavelet Tracker (100), a controller (400), a video frame grabber (301), a symbol generator (304), a video multiplexer (302) and a video digital/analog converter (303) unit (FIG. 3).

In the automatic video tracking unit (300), the video (K) is input to the video frame grabber (301). The video (K) is digitized and converted into video frames (H) by the video frame grabber (301) and is sent to the controller (400) and video multiplexer (302). The controller (400) processes the user input (I) and video frames (H) and sends them to the Complex Wavelet Tracker (100) and updates the target status (J) by evaluating the information it receives from the Complex Wavelet Tracker (100). The target status (J) is also transferred to the symbol generator (304). The symbol generator (304) converts the target status (J) into appropriate symbols, and delivers the symbol (L) frames, which comprise graphics to be overlayed on the video frames (H), to the video multiplexer (302). The video multiplexer (302) produces video frames with symbols (N) by overlaying these symbols (L) onto the ordinary video frames (H) and transmits them to the video digital/analog converter (403). This converter (403) converts the video frames with symbols (N) to an analog video format and outputs video with symbols (S).

In this embodiment, the controller (400) provides the data (A, B, E and F) required by the Complex Wavelet Tracker (100). In the case that the data provided is not in a format used by the Complex Wavelet Tracker (100), it converts these data into a proper format used by the tracker (100) and upon evaluating the track parameters (G) it acquires from the tracker (100), updates the new position of the target. In case the video is colored, this unit (400) transforms the video frames (H) into grayscale images (A and B).

In this embodiment, the controller (400) comprises a tracker controller (401) and an image controller (402) (FIG. 4).

The tracker controller (401), upon evaluating the information (I) it receives from the user, determines the area desired to be tracked on the video frames and generates the information regarding the track gate (E) and the mask (F) of the said gate. It also updates the target status (J) using the estimated track parameters (G) received from the Complex Wavelet Tracker (100). The target status (J) includes information regarding the new position of the track gate and the track status. The track status gives information about the tracking state. This information provides information regarding whether or not tracking is carried out, whether or not the target is missed and/or information about tracking quality. Information about tracking quality is computed using the confidence measure included in Formula (33) which provides information regarding the quality of the estimation performed by the complex wavelet tracker (100).

The image controller (402), depending on the track gate (E) information, produces appropriate images such that they comprise the area to be tracked from the present and the previous video frame (H) and sends them to the Complex Wavelet Tracker (100) as image-1 (A) and image-2 (B).

The application of the inventive complex wavelet tracker (100, 110) to area tracking and/or to other different fields, the complex wavelet tracker (100, 110) can be adapted to the applied field generally by simply changing the structure of the controller (400) according to the requirements of the application. Within this scope, images may not be required to be consecutive or the track gate (E) may not have to be updated. In some embodiments, the first image (A) can be kept as a template and the tracking can be carried out by advancing the other image (B) along the video frames. In addition to this, the first image (A) being kept as the template, can be updated by warping according to the estimated track parameters (G). For background stabilization, camera calibration or ego-motion estimation, fixed track gates (E) can be formed within the video frames (H) and by means of the estimated track parameters (G) the ego-motion of the camera can be determined. In this way, motion estimation required in video compressing algorithms such as MPEG1, MPEG2 and MPEG4 can be provided by the complex wavelet tracker (100, 110).

The inventive complex wavelet tracker (100, 110) might not require a track gate (E) and/or a mask (F) according to the type of the embodiment. If the area to be tracked always comprises the entire image (A) it is sufficient to maintain the track gate such that it defines the entire image or to adjust the mask (F) such that it selects the entire image. In another embodiment, if it is enough to determine only the displacements, the two parameter translational motion model is sufficient for this. Here, the parameters of the motion model will actually be equal to the motion vector of the area. This is equivalent to the known block motion estimation.

Within the scope of the invention, affine motion estimation of an area within certain limitations is possible by including the parametric model to the solution without changing the structure of the CDWT. As the area to be tracked can be defined as a rectangle, it can also be defined as any shape with the help of a mask (F). Accordingly, the present invention makes it possible to estimate an area according to a certain motion model by generalizing the CDWT based dense motion estimation method [1]. Furthermore, this complex wavelet tracker (100, 110), which is primarily developed for area tracking purposes, has a structure that allows it to be applied in many other fields in addition to tracking.

The fact that the invention is based on a flow-based tracking method, enables the tracker not to lose the target even at radical changes. The fact that the method used by the complex wavelet tracker (100, 110) for area tracking is phase-based makes the tracker more robust against noise and illumination changes in comparison to the trackers using intensity-based methods. Additionally, the fact that the method used is phase-based also provides a more realistic tracking in smooth surfaces with fewer details compared to intensity-based methods. The non-iterative nature of the method used enables the computational load to be deterministic. As a result, in addition to the advantages provided by the complex wavelet tracker (100, 110) over the intensity-based methods, the inventive method provides tracking as accurate as the one provided by intensity-based methods.

In the invention, the definition of the area motion with a parametric model makes it possible to estimate motions such as scale, rotation and shear depending on the motion model in addition to translational motion of the area. The application of parametric motion model to the CDWT has been realized within the scope of this invention.

It is possible to develop various embodiments of the said invention within the framework of the basic principles described herein. The inventive complex wavelet tracker (100, 110) can not be limited to the examples provided above for the description of the invention.

INDUSTRIAL APPLICABILITY OF THE INVENTION

With the help of the said invention automatic video tracking systems will be able to be more robust and more accurate. Automatic video tracking systems, which are widely employed in military and civilian fields and used with electro-optical systems, will be able to provide a more successful tracking capability than other similar systems by realizing the methods described within the scope of the present invention. This invention can be realized by means of various software and/or hardware.

In the description of the said invention, only its application in the field of automatic target tracking is included and comparisons are made with the similar systems in the field of target tracking. In addition to automatic target tracking, this method can also be adapted to and used in fields like motion estimation, video compression, camera calibration, image registration, video stabilization. Application of this invention in the fields mentioned above and in other fields is within the scope of this invention.

REFERENCES

[1] J. Magarey and N. Kingsbury, "Motion Estimation Using a Complex-Valued Wavelet Transform," *IEEE Transactions on Signal Processing*, Vol. 46, no. 4, P. 1069-1084, 1998.

[2] A. M. Tekalp, *Digital Video Processing*, Prentice-Hall Inc., 1995.

[3] I. Matthews, T. Ishikawa, and S. Baker, "The Template Update Problem," *IEEE Transactions on Pattern Analysis and Machine Intelligence*, Vol. 26, no. 6, P. 810-815, 2004.

[4] B. Lucas and T. Kanade, "An Iterative Image Registration Technique with an Application to Stereo Vision," *Proceedings of DARPA Image Understanding Workshop*, P. 121-130, 1981.

[5] J. Shi and C. Tomasi, "Good Features to Track," *IEEE Conference on Computer Vision and Pattern Recognition*, Seattle, 1994.

[6] G. D. Hager and P. N. Belhumeur, "Efficient Region Tracking With Parametric Models of Geometry and Illumination," *IEEE Transactions on Pattern Analysis and Machine Intelligence*, Vol. 20, no. 10, P. 1025-1039, 1998.

[7] S. Baker and I. Matthews, "Lucas-Kanade 20 Years On: A Unifying Framework: Part 1," CMU-RI-TR-02-16, *Robotics Institute*, Carnegie Mellon University, 2003.

[8] R. N. Bracewell, "Affine Theorem for Two-Dimensional Fourier Transform," *Electronics Letters*, Vol. 29, no. 3, 1993.

[9] F. C. A. Fernandes, R. L. C. v. Spaendonck and C. S. Burrus, "A New Framework for Complex Wavelet Transforms," *IEEE Transactions on Signal Processing*, P. 1825-1837, 2003.

[10] R. DeVore, A. Petukhov, and R. Sharpley, "Motion Estimation with the Redundant Wavelet Transform," *IEEE International Workshop on Digital and Computational Video*, P. 53-59, 2002.

[11] N. Sebe, C. Lamba, and M. S. Lew, "An Overcomplete Discrete Wavelet Transform for Video Compression," *ICME*, 2002.

The invention claimed is:

1. A method characterized by a track parameters estimation unit which realizes the steps of starting estimation from the lowest resolution level ($m=m_{max}$);

estimating track parameters (p) for a single level by using complex discrete wavelet transforms at this level (m) wherein estimation of the track parameters (p) is performed by defining a parametric motion model ($M(x;p^{(m)})$) for the selected area and estimating the track parameters (p) in the CDWT domain satisfying the equality of $$D^{(s,m)}(x,t_{n-1}) - D^{(s,m)}(M(x;p^{(m)}),t_n) = e^{(s,m)}(x)$$

where $D^{(s,m)}(x,t)$ denotes the CDWT coefficient at location x of the detailed subband s of level m of the video frame at time t and $e^{(s,m)}$ denotes the CDWT subband noise;

adding track parameters (p) to the cumulative track parameters (p');

scaling the cumulative tracking parameters (p') to the next upper resolution level (m−1);

if the current level (m) is the uppermost resolution level ($m=m_{min}$), completing the estimation of the track parameters where the solution is provided in the cumulative track parameters (p') scaled to the original resolution level (m=0);

if the current level is not the uppermost resolution level ($m \neq m_{min}$), warping the coefficients of the complex discrete wavelet transform of the first image at the next upper level (m−1) according to the motion model M by using the cumulative track parameters p';

proceeding to the next upper resolution level (m=m−1) and continuing with the step of estimating the track parameters.

2. A method according to claim 1 which provides the confidence of the estimation of the area defined with W performed for the frames at times $t_{n-1}$ and $t_n$ with the following measure:

$$C^{(m)}(W^{(m)}(t_{n-1}); t_{n-1}, t_n) = 1 - \frac{r^{(m)}(W^{(m)}(t_{n-1}); t_{n-1}, t_n)}{2}.$$

3. A method according to any of the claim 1 wherein the warping of the CDWT is realized by having the CDWT coefficients in the detailed subbands of the pixels located within the selected area warped according to the motion model used and by obtaining the CDWT coefficients for the pixels corresponding to subpixel locations with an interpolation function.

4. A method according to claim 1, wherein it realizes single level estimation of the track parameters (p) for all detailed subbands of the CDWT of the images in the current processed level by calculating the p parameters which minimize the sum of the squares of the difference between the CDWT coefficients of the pixels belonging to the first image within the track gate (E) and the CDWT coefficients of the pixels at the corresponding positions upon being warped by the p parameters according to the motion model of the second image.

5. A method according to claim 4, wherein it realizes single level estimation of the track parameters (p) by finding the p parameters that minimize the following expression $$\sum_{x \in W^{(m)}(t_{n-1})} w^{(m)}(x) \sum_{s=1}^{6} \frac{|D^{(s,m)}(x, t_{n-1}) - D^{(s,m)}(M(x, p), t_n)|^2}{P^{(s,m)}}.$$

6. A method according to claim 5, wherein it realizes single level estimation of the track parameters (p) by finding the p parameters that satisfy the following equality $$\sum_{s=1}^{6} \sum_{x \in W^{(m)}(t_{n-1})} \frac{w^{(m)}(x)}{P^{(s,m)}}$$

$$E^{(s,m)}(x, t_{n-1}, t_n) \big[\Omega_1 \tilde{M}_1(x; p^{(m)}) + \Omega_2 \tilde{M}_2(x; p^{(m)}) - \theta^{(s,m)}(x)\big]$$

$$\big(\Omega_1 \nabla \tilde{M}_1(x; p^{(m)}) + \Omega_2 \nabla \tilde{M}_2(x; p^{(m)})\big) = 0.$$

7. A method according to claim 6 wherein it realizes single level estimation of the track parameters (p) by finding the p parameters that satisfy the following equality $$Tp = a.$$

8. A method according to claim 7 wherein in the step of adding track parameters (p) to the cumulative track parameters, processes are realized by T and a matrices instead of track parameters p and the cumulative track parameters (p') are obtained as $p'=(T')^{-1}(a')$ using the calculated T' and a'; and wherein the step of scaling the cumulative track parameters to the next upper resolution level is realized by matrices T and a in addition to p.

9. A method according to claim 8 wherein the step of adding track parameters (p) to the cumulative track parameters is realized first by adding Tp' to matrix a, and adding the T and a matrices to the cumulative matrices T' and a', then calculating the cumulative track parameters as $p'=(T')^{-1}(a')$.

10. A method according to claim 7 wherein it realizes single level estimation of the track parameters (p) for the translational motion model by using the following matrices $$T = \sum_{s=1}^{6} \sum_{x \in W^{(m)}(t_{n-1})} \frac{w^{(m)}(x)}{P^{(s,m)}} E^{(s,m)}(x, t_{n-1}, t_n) \begin{bmatrix} \Omega_1^2 & \Omega_1 \Omega_2 \\ \Omega_1 \Omega_2 & \Omega_2^2 \end{bmatrix}$$

$$a = \sum_{s=1}^{6} \sum_{x \in W^{(m)}(t_{n-1})} \frac{w^{(m)}(x)}{P^{(s,m)}} E^{(s,m)}(x, t_{n-1}, t_n) \theta^{(s,m)}(x) \begin{bmatrix} \Omega_1 \\ \Omega_2 \end{bmatrix}$$

and calculating the p parameters as $p = T^{-1} a$.

11. A method according to claim 10 wherein scaling of the track parameters (p) to the next upper resolution level is realized for the translational motion model by doubling the values of the track parameters.

12. A method according to claim 11 wherein scaling the cumulative track parameters to the next upper resolution level for the translational motion model is realized by scaling the T matrix values by ¼.

13. A method according to claim 7 wherein it realizes single level estimation of the track parameters (p) for the similarity motion model by using the following matrices $$T = \sum_{s=1}^{6} \sum_{x \in W^{(m)}(t_{n-1})} \frac{w^{(m)}(x)}{P^{(s,m)}} E^{(s,m)}(x, t_{n-1}, t_n) \begin{bmatrix} U & V \\ V^T & Z \end{bmatrix}$$

$$a = \sum_{s=1}^{6} \sum_{x \in W^{(m)}(t_{n-1})} \frac{w^{(m)}(x)}{P^{(s,m)}} E^{(s,m)}(x, t_{n-1}, t_n) \theta^{(s,m)}(x) \begin{bmatrix} \Omega_1 x_1 + \Omega_2 x_2 \\ \Omega_2 x_1 - \Omega_1 x_2 \\ \Omega_1 \\ \Omega_2 \end{bmatrix}$$

where $$U = \begin{bmatrix} (\Omega_1 x_1 + \Omega_2 x_2)^2 & (\Omega_1 x_1 + \Omega_2 x_2)(\Omega_2 x_1 - \Omega_1 x_2) \\ (\Omega_1 x_1 + \Omega_2 x_2)(\Omega_2 x_1 - \Omega_1 x_2) & (\Omega_2 x_1 - \Omega_1 x_2)^2 \end{bmatrix}$$

$$V = \begin{bmatrix} \Omega_1(\Omega_1 x_1 + \Omega_2 x_2) & \Omega_2(\Omega_1 x_1 + \Omega_2 x_2) \\ \Omega_1(\Omega_2 x_1 - \Omega_1 x_2) & \Omega_2(\Omega_2 x_1 - \Omega_1 x_2) \end{bmatrix}$$

$$Z = \begin{bmatrix} (\Omega_1)^2 & (\Omega_1 \Omega_2) \\ (\Omega_1 \Omega_2) & (\Omega_2)^2 \end{bmatrix}$$

and calculating the p parameters as $p = T^{-1} a$.

14. A method according to claim 13 wherein scaling of the tracking parameters (p) to the next upper resolution level is realized for the similarity motion model by doubling the track parameters $p_3$ and $p_4$.

15. A method according to claim 14 wherein scaling the cumulative track parameters to the next upper resolution level for the similarity motion model is realized by scaling the values of matrix V and matrix Z which constitute the T matrix by ½ and ¼, respectively, and scaling the values of $a_3$ and $a_4$ which constitute the a matrix by ½.

16. A method according to claim 7 wherein it realizes single level estimation of the tracking parameters (p) for the affine motion model by using the following matrices $$T = \sum_{s=1}^{6} \sum_{x \in W^{(m)}(t_{n-1})} \frac{w^{(m)}(x)}{P^{(s,m)}} E^{(s,m)}(x, t_{n-1}, t_n) \begin{bmatrix} U & V \\ V^T & Z \end{bmatrix}$$

$$a = \sum_{s=1}^{6} \sum_{x \in W^{(m)}(t_{n-1})} \frac{w^{(m)}(x)}{P^{(s,m)}} E^{(s,m)}(x, t_{n-1}, t_n) \theta^{(s,m)}(x) \begin{bmatrix} \Omega_1 x_1 \\ \Omega_2 x_1 \\ \Omega_1 x_2 \\ \Omega_2 x_2 \\ \Omega_1 \\ \Omega_2 \end{bmatrix}$$

where $$U = \begin{bmatrix} (\Omega_1 x_1)^2 & (\Omega_1 \Omega_2 x_1^2) & (\Omega_1^2 x_1 x_2) & (\Omega_1 \Omega_2 x_1 x_2) \\ (\Omega_1 \Omega_2 x_1^2) & (\Omega_2 x_1)^2 & (\Omega_1 \Omega_2 x_1 x_2) & (\Omega_2^2 x_1 x_2) \\ (\Omega_1^2 x_1 x_2) & (\Omega_1 \Omega_2 x_1 x_2) & (\Omega_1 x_2)^2 & (\Omega_1 \Omega_2 x_2^2) \\ (\Omega_1 \Omega_2 x_1 x_2) & (\Omega_2^2 x_1 x_2) & (\Omega_1 \Omega_2 x_2^2) & (\Omega_2 x_2)^2 \end{bmatrix}$$

$$V = \begin{bmatrix} (\Omega_1^2 x_1) & (\Omega_1 \Omega_2 x_1) \\ (\Omega_1 \Omega_2 x_1) & (\Omega_2^2 x_1) \\ (\Omega_1^2 x_2) & (\Omega_1 \Omega_2 x_2) \\ (\Omega_1 \Omega_2 x_2) & (\Omega_2^2 x_2) \end{bmatrix}$$

$$Z = \begin{bmatrix} (\Omega_1)^2 & (\Omega_1 \Omega_2) \\ (\Omega_1 \Omega_2) & (\Omega_2)^2 \end{bmatrix}$$

and calculating the p parameters as $p = T^- a$.

17. A method according to claim 16 wherein scaling of the tracking parameters (p) to the next upper resolution level is realized for the affine motion model by doubling the track parameters $p_5$ and $p_6$.

18. A method according to claim 17 wherein scaling the cumulative track parameters to the next upper resolution level for the affine motion model is realized by scaling the values of matrix V and matrix Z which constitute the T matrix by ½ and ¼, respectively, and scaling the values of $a_5$ and $a_6$ which constitute the a matrix by ½.

19. A method according to claim 4, wherein it realizes single level estimation of the track parameters (p) by finding the p parameters that minimize the following expression $$\sum_{k=1}^{3} \sum_{x \in W^{(m)}(t_{n-1})} w^{(m)}(x) \frac{|D_k^{(s,m)}(x, t_{n-1}) - D_k^{(s,m)}(M(x, p), t_n)|^2}{\sigma_k^2 P^{(s,m)}}$$

upon the incoming images (A and B) being colored and the CDWT's (C and D) of the three color components being input to the track parameters estimation unit.

* * * * *